United States Patent Office 3,850,870
Patented Nov. 26, 1974

3,850,870
POLYMERIC IMPRESSION MOLDING MATERIALS HAVING GOOD DIMENSIONAL STABILITY
Masato Kawakami, Ryotaro Ono, Minoru Furuichi, and Shigeru Kato, Yokohama, Japan, assignors to Japan Synthetic Rubber Company Limited, Tokyo, Japan
Continuation-in-part of abandoned application Ser. No. 138,570, Apr. 29, 1971. This application Aug. 30, 1973, Ser. No. 393,189
Claims priority, application Japan, May 1, 1970, 45/37,307, 45/37,308
Int. Cl. C08d 7/02; C08f 47/00
U.S. Cl. 260—29.7 PT
10 Claims

ABSTRACT OF THE DISCLOSURE

Impression materials prepared by coagulating with an inorganic electrolyte a mixture of at least one latex selected from the group consisting of natural and synthetic rubber latices and at least one emulsion selected from the group consisting of polycyclopentadiene emulsion and vinyl polymer emulsions, and said impression materials which contain a mold releasing agent which is at least one compound selected from the group consisting of liquid paraffin, solid paraffin, squalane, and monoolefinic and diolefinic hydrocarbons.

CROSS-REFERENCE TO RELATED APPLICATIONS

This application is a continuation-in-part of co-pending application Ser. No. 138,570, filed on Apr. 29, 1971, and now abandoned.

BACKGROUND OF THE INVENTION

1. Field of the Invention

This invention relates to impression materials of high-polymer emulsions. More particularly, the invention relates to impression materials which are prepared by coagulating with an inorganic electrolyte a mixture of at least one latex selected from the group consisting of natural and synthetic rubber latices and at least one emulsion selected from the group consisting of polycyclopentadiene emulsions and vinyl polymer emulsions, and said impression materials which contain a novel mold releasing agent.

2. Description of the Prior Art

Impression materials which have usually been employed by dentists include gypsum plaster, silicone rubber, Thiokol, and sodium alginate. These known materials have the following disadvantages. Gypsum plaster has good shape-holding property (dimensional stability) but, when placed and set in a female mold having a cavity of a larger diameter than the mouth, plaster cannot be taken out without destroying the mold. Also, when impressions of protruding objects are to be taken, plaster may fail to serve the purpose with objects of certain configurations. Silicone rubber is expensive and inconvenient for application because it must be used as a mixture of three different solutions. Thiokol has a very offensive smell and is costly, although it exhibits good shape-holding property. Sodium alginate is excellent in that it is odorless and economical, but its casting undergoes such sharp dimensional change with time that it must be disposed of immediately after the impression-taking.

SUMMARY OF THE INVENTION

It is an object of the present invention to provide impression materials which do not have the foregoing disadvantages but are inexpensive and easy to handle.

Another object of the invention is to provide impression materials which possess remarkably good mold releasability in addition to the above-mentioned features.

Polymer latices in the form of emulsions are usually destroyed by the addition of an inorganic salt to change them to gels or coagulums. The impression materials according to this invention take advantage of this phenomenon. In the state of a coagulum, a polymer latex requires some elasticity and rigidity because, after the removal of the mold with intricate configurations, it has to reproduce the original configurations of the mold.

A material which satisfies the above requirements to a large measure is a highly concentrated styrene butadiene rubber latex (e.g., goods' name of Japan Synthetic Rubber Co., Ltd.; JSR#0561). This SBR latex can provide an impression material when it is half coagulated with calcium sulfate, allowed to set in a mold for minutes, and freed of the mold. However, when used as an impression material, the latex displays somewhat inadequate dimensional stability with time due to shrinkage and, in order to reproduce the mold configurations, it must be treated within two hours after the impression-taking. (Refer to Referential Examples 1 to 5.)

It has now been found that, when a latex mixture prepared by adding a suitable amount of at least one substance from the group consisting of polycyclopentadiene emulsion and vinyl polymer emulsions to a natural rubber latex or synthetic rubber latex such as SBR latex, the resulting casting undergoes very little dimensional change with time and remains dimensionally stable for more than 16 hours. The present invention is based on this discovery.

The present invention thus provides impression materials which are prepared by coagulating with an inorganic electrolyte a mixture of at least one material selected from the group consisting of natural rubber and synthetic rubber latices (emulsions), and a polycyclopentadiene emulsion.

Also the present invention provides impression materials which are prepared by coagulating with an inorganic electrolyte a mixture of at least one material selected from the group consisting of natural rubber and synthetic rubber latices (emulsions), and an emulsion of a homopolymer or copolymer of vinyl monomers having the general formula

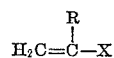

wherein X represents a hydrogen atom, an alkyl group having $C_1$–$C_{20}$, an aryl group, advantageously a nucleus selected from the group consisting of the phenyl series, e.g., phenyl, a halogen atom, a nitrile group, a carboxyl group, a carboalkoxy group or an acyloxy group, and R represents a hydrogen atom, an alkyl group having $C_1$–$C_{10}$, or an alkenyl group having $C_2$–$C_{10}$.

The impression molds formed of the afore-mentioned high-polymer latex impression materials have most satisfactory reproducibility in dimensions and otherwise. However, if the shape to be cast is made of a material highly affinitive to any latex component of the particular impression material, for example, a synthetic high polymer, such as polymethyl methacrylate to constitute artificial teeth, the impression mold may partly adhere to the shape to be cast, thus producing some indentations or irregularities on the resultant surface. In extreme cases the impression mold is partly torn off and the impression material fails to serve properly. Such cases, however, are not rare.

In view of the foregoing, we made diversified investigations and have found that, if liquid paraffin, solid paraffin, squalane, or a monoolefinic or diolefinic hydrocarbon is emulsified with a surface active agent and a small amount of the resulting emulsion is added, the mold releasing property of our impression materials can be surprisingly improved without any unfavorable effect upon the inherent features of the materials, such as shrinkage resistance, fluidity, pliability, setting time, and strength after setting. This discovery has led to the present invention.

DESCRIPTION OF THE PREFERRED EMBODIMENT

Figure 1:
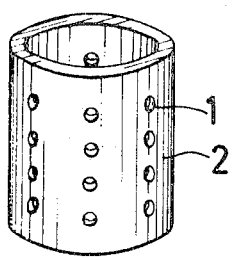
FIG. 1 is a perspective view of a container for impression material.

Thus, the present invention provides impression materials which are prepared by coagulating in an inorganic electrolyte a mixture of at least a member of the group consisting of natural rubber and synthetic rubber latices (emulsions), at least a member of the group selected from the group consisting of polycyclopentadiene emulsion and vinyl polymer emulsions, and at least a member of the group consisting of liquid paraffin, solid paraffin, squalane, and monoolefinic and diolefinic hydrocarbons. In the practice of the present invention, synthetic rubbers which may be used include styrene-butadiene rubber (SBR), polybutadiene (BR), polyisoprene (IR), acrylonitrilebutadiene rubber (NBR), isobutylene-isoprene rubber (IIB), ethylene-propylene-diene rubber (EPR), and acrylic rubber. Suitable polycyclopentadiene is a polymer of cyclopentadiene in 1,4- or 1,2 form polymerized to a series of five-member carbon rings, with a molecular weight of approximately $$[\eta]_{toluene}^{30°C.} = 0.1 - 5.0.$$

The suitable combined concentration of a ruber latex and polycyclopentadiene emulsion ranges from 60 to 90 percent, preferably from 65 to 85 percent, on a dry weight basis. The proportion of the polycyclopentadiene emulsion which is sufficient for achieving its purpose is between 10 and 50 percent, preferably between 15 and 30 percent, on the basis of the weight of the mixture of the rubber latex and polycyclopentadiene emulsion.

Among the homopolymers and copolymers which may be employed for the present invention are, for example, polyolefins, polystyrene, poly-α-methyl styrene, polyvinyl chloride, polyacrylonitrile, polyacrylic acid esters, polymethyl methacrylate, polyvinyl acetate, styrene-butadiene copolymer (with a styrene content of over 50 percent by weight), acrylonitrile-styrene copolymer, and acrylonitrile-butadiene-styrene resin. Polystyrene, polymethyl methacrylate and styrene-butadiene copolymer are particularly desirable.

Suitable combined concentrations of a rubber latex and vinyl polymer emulsions to be used in the present invention are between 60 and 90 percent, and preferably between 65 and 85 percent, on the basis of total solid content (TSC) weight.

The mixing ratio of natural rubber or synthetic rubber to a vinyl polymer may suitably range from 90–50 percent rubber latex to 10–15 percent vinyl polymer emulsion.

Useful dispersion stabilizers for the mixture of a rubber latex and polycyclopentadiene emulsion or vinyl polymer emulsion are salts of fatty acids, alkylbenzene sulfonic acids, sulfuric esters of higher alcohols, and alkylsulfonic acids. Inorganic electrolytes as coagulants may include gypsum, magnesium sulfate, aluminum sulfate, iron sulfate, sodium silicofluoride, and alum. These may be used either singly or in combination. Generally, such an inorganic electrolyte may be used in an amount ranging from 1 to 50 percent, preferably from 1 to 25 percent, on the basis of the weight of the polymer latex.

The impression materials of the present invention form molds which are dimensionally stable for many hours as above described. When impression molds are to be made in a lot of tens or hundreds at one time, it is only necessary to form a master mold and then reproduce it as with gypsum. This permits remarkable improvements in working efficiency and operation procedure. Moreover, it offers an additional advantage of great ease of operation in that the impression-taking and mold processing can be performed in different places.

The liquid paraffin, solid paraffin, squalane, or monoolefinic or diolefinic hydrocarbon which may be used as a mold releasing agent preferably has from 10 to 200 carbon atoms and a boiling point of over 100° C. Whether of straight chain or branched, the structure has no adverse effect upon the mold releasing property. The amount of the compound which is used as a mold releasing agent is suitably between 0.5 and 10 percent, preferably between 1 and 3 percent, on the basis of the dry weight of the latex.

Heretofore, silicone resin, solid wax and the like have been employed as mold releasing agents. They are not mixed in impression materials but applied on the objects of impression so that the impressions can be taken using the impression materials. The mold releasing agent according to the present invention, by contrast, is mixed beforehand in an impression material and, therefore, the object to be impressed needs no pretreatment at all. Immediately after the object of impression is cleaned, the impression is taken using the impression material. Then, the mold releasing agent in the impression material acts by itself to faciltate the mold releasing, and an impression mold having very smooth surface is produced. In other words, the present invention has an amazing advantage of omitting the step of applying a mold lubricant to the object of impression.

The impression materials according to the present invention may also contain, if necessary, a filler, such as, calcium carbonate, talc or diatomaceous earth, and/or a viscosity-increasing agent, such as, sodium alginate, potassium alginate, polyacrylate or carboxymethylcellulose and/or a pH controlling agent (setting-rate-adjusting agent), such as, sodium pyrophosphate, potassium pyrophosphate, sodium carbonate or potassium carbonate.

The present invention will be more fully described below with reference to the accompanying drawing and in connection with the following examples which are not in any way restrictive and also with referential examples, in which all parts and percentages are by weight.

REFERENTIAL EXAMPLES 1 TO 5

(A) Preparation of master latex

|  | Parts |
|---|---|
| SBR latex (JSR #0561) | 100 |
| Sodium alginate | 0.5 |
| Sodium pyrophosphate | 0.5 |
| Calcium carbonate | 10 |
| Total | 111.0 |

These were thoroughly mixed up and the mixture was allowed to stand for not less than one full day. (A suitable amount of an alcoholic solution of phenol phthalein may be added as a colorant.)

(B) Use as impression material (a) Preparation of impression material and impression-taking:

|  | Parts |
|---|---|
| Master latex | 100 |
| β-Gypsum | 15 |

These were thoroughly mixed up for one minute, and the mixture was poured before setting into a cylindrical impression material container 2, as shown in FIG. 1, having perforations 1 which were 1.2 mm. in diameter.

Figure 2:
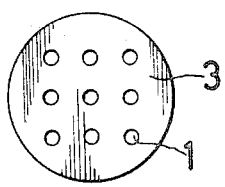
FIG. 2 is a bottom view of the container of FIG. 1.
Figure 3:
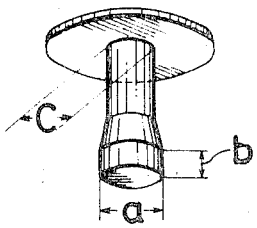
FIG. 3 is a perspective view of an impression mold.

The container was 12.5 mm. in inside diameter and 15 mm. in height. As shown in FIG. 2, it also has perforations 1 at the bottom 3. Next, an impression mold as shown in FIG. 3 (measurements: $a=7.0$ mm., $b=2.3$ mm., and $c=6.0$ mm.) was forced into the container and kept as it was for 5 minutes at room temperature. After setting of the impression material, the impression mold was removed.

(b) Reproduction with gypsum from mold of impression material:

|  | Parts |
|---|---|
| β-Gypsum | 100 |
| Water | 30 |

Figure 4:
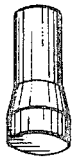
FIG. 4 is a perspective view of a reproduced mold.

These were thoroughly mixed up, and the mixture was poured into the mold of impression material with vibration by a vibrator. The mixture was allowed to stand at room temperature 20° C. for 20 minutes for setting. Thereafter, a mold (as shown in FIG. 4) which had been reproduced with gypsum was taken out.

As a criterion for measurement of dimensional stability, impressions were taken with an impression material in conformity with the procedure (a) above, and the impression molds were removed, and allowed to stand for different periods of time at room temperature before the impression molds were reproduced with gypsum, and the dimensions of the molds reproduced with gypsum were measured. The results are shown in Table 1.

TABLE I

|  | Referential example— | | | | | Actual mold dimensions |
|---|---|---|---|---|---|---|
|  | 1 | 2 | 3 | 4 | 5 | |
| Standing time (hours) | 0 | 1.5 | 3.0 | 6.0 | 16.0 | |
| a (mm.) | 7.00 | 7.00 | 7.10 | 6.65 | 6.70 | 7.00 |
| b (mm.) | 2.15 | 2.15 | 2.20 | 2.30 | 2.30 | 2.30 |
| c (mm.) | 6.00 | 6.30 | 6.70 | 6.40 | 6.40 | 6.00 |

EXAMPLES 1 TO 3

As the master latex, not SBR latex alone but a mixture of the latex and a polycyclopentadiene emulsion (with a solid content of 80 percent) was used in the impression-taking in the same manner as described in Referential Examples 1 to 5. The data are given in Table 2 (in which case, however, the standing time is zero).

TABLE 2

|  | Referential example 1 | Example 1 | Example 2 | Example 3 | Actual mold size |
|---|---|---|---|---|---|
| CPD emulsion* (percent) | 0 | 10 | 20 | 25 | |
| JSR #0561 (percent) | 100 | 90 | 80 | 75 | |
| a (mm.) | 7.00 | 7.00 | 7.00 | 7.00 | 7.00 |
| b (mm.) | 2.15 | 2.20 | 2.25 | 2.30 | 2.30 |
| c (mm.) | 6.00 | 6.00 | 6.00 | 6.00 | 6.00 |

EXAMPLES 4 TO 8

As the master latex, a mixed latex of 75 percent JSR #0561 and 25 percent polycyclopentadiene emulsion was used and the standing time was varied following the impression-taking as in Referential Examples 1 to 5, and the reproducibility with gypsum was observed. The results are given in Table 3.

TABLE 3

|  | Example— | | | | | Actual mold size |
|---|---|---|---|---|---|---|
|  | 4 | 5 | 6 | 7 | 8 | |
| Standing time (hours) | 0 | 1.5 | 3.0 | 6.0 | 16.0 | |
| a (mm.) | 7.00 | 7.00 | 7.00 | 6.95 | 7.00 | 7.00 |
| b (mm.) | 2.30 | 2.20 | 2.15 | 2.20 | 2.25 | 2.30 |
| c (mm.) | 6.00 | 6.10 | 6.15 | 6.15 | 6.05 | 6.00 |

EXAMPLES 9 AND 10

As the master latex, as mixture of SBR latex and polyvinyl acetate emulsion (TSC 61%) was used, rather than the SBR latex alone, for impression-taking in the same manner as in Referential Examples 1 to 5. The results are shown in Table 4. In these examples the standing time was zero.

TABLE 4.—WHERE SBR LATEX WAS USED WITH POLYVINYL ACETATE

|  | Referential example 1 | Example 9 | Example 10 | Mold dimensions |
|---|---|---|---|---|
| Polyvinyl acetate emulsion (percent) | 0 | 10 | 20 | |
| JSR #0561 (percent) | 100 | 90 | 80 | |
| Dimension: | | | | |
| a (mm.) | 7.00 | 7.00 | 7.00 | 7.00 |
| b (mm.) | 2.15 | 2.20 | 2.25 | 2.30 |
| c (mm.) | 6.00 | 6.00 | 6.10 | 6.00 |

EXAMPLES 11 TO 15

As the vinyl polymer, polyvinyl chloride in the form of an emulsion (TSC 69%) was employed. The results are given in Table 5. The standing time was zero in Examples 9 and 10.

TABLE 5.—WHERE SBR LATEX WAS USED WITH POLYVINYL CHLORIDE

|  | Referential example 1 | Example— | | | | |
|---|---|---|---|---|---|---|
|  |  | 11 | 12 | 13 | 14 | 15 |
| Polyvinyl chloride emulsion (percent) | 0 | 10 | 20 | 25 | 30 | 40 |
| JSR #0561 (percent) | 100 | 90 | 80 | 75 | 70 | 60 |
| Dimension: | | | | | | |
| a (mm.) | 7.00 | 6.95 | 6.95 | 6.95 | 6.90 | 6.90 |
| b (mm.) | 2.15 | 2.25 | 2.25 | 2.25 | 2.25 | 2.25 |
| c (mm.) | 6.00 | 6.05 | 6.05 | 6.10 | 6.10 | 6.05 |

EXAMPLES 16 TO 20

As the vinyl polymer, a polymethyl methacrylate (MMA) emulsion (TSC 65%) was used. The results are given in Table 6. The standing time was zero as in Examples 9 and 10.

TABLE 6.—WHERE SBR LATEX WAS USED WITH POLY-MMA

|  | Referential example 1 | Example— | | | | |
|---|---|---|---|---|---|---|
|  |  | 16 | 17 | 18 | 19 | 20 |
| Poly-MMA emulsion (percent) | 0 | 10 | 20 | 30 | 40 | 50 |
| JSR #0561 (percent) | 100 | 90 | 80 | 70 | 60 | 50 |
| Dimension: | | | | | | |
| a (mm.) | 7.00 | 7.00 | 7.00 | 7.00 | 7.00 | 6.95 |
| b (mm.) | 2.15 | 2.25 | 2.25 | 2.25 | 2.30 | 2.25 |
| c (mm.) | 6.00 | 6.05 | 6.05 | 6.05 | 6.05 | 6.15 |

EXAMPLES 21 TO 25

As the vinyl polymer, a polystyrene emulsion (TSC 68%) was used. The results are shown in Table 5. As in Examples 9 and 10, the standing time was zero.

TABLE 7.—WHERE SBR LATEX WAS USED WITH POLYSTYRENE

|  | Referential example 1 | Example— | | | | |
|---|---|---|---|---|---|---|
|  |  | 21 | 22 | 23 | 24 | 25 |
| Polystyrene emulsion (percent) | 0 | 10 | 20 | 30 | 40 | 50 |
| JSR #0561 (percent) | 100 | 90 | 80 | 70 | 60 | 50 |
| Dimension: | | | | | | |
| a (mm.) | 7.00 | 7.00 | 7.00 | 7.00 | 7.00 | 7.00 |
| b (mm.) | 2.15 | 2.30 | 2.30 | 2.30 | 2.30 | 2.30 |
| c (mm.) | 6.00 | 6.05 | 6.05 | 6.05 | 6.05 | 6.05 |

EXAMPLES 26 TO 30

Using a master latex of 75 percent JSR #0561 and 25 percent polymethyl methacrylate, the dimensional changes with time and the reproducibility of mold dimensions were examined in the same manner as described in Referential Examples 1 to 5. The results were as given in Table 8.

TABLE 8.—TIME DEPENDENCY OF POLY-MMA-CONTAINING IMPRESSION MATERIAL

| | Example— | | | | |
|---|---|---|---|---|---|
| | 26 | 27 | 28 | 29 | 30 |
| Standing time (hours) | 0 | 1.5 | 3.0 | 6.0 | 16.0 |
| Dimension: | | | | | |
| a (mm.) | 6.95 | 6.95 | 6.95 | 7.05 | 7.00 |
| b (mm.) | 2.30 | 2.30 | 2.30 | 2.30 | 2.30 |
| c (mm.) | 7.05 | 6.05 | 6.05 | 6.05 | 6.10 |

EXAMPLES 31 TO 35

As the master latex, a mixture of 75 percent JSR #0561 and 25 percent polystyrene emulsion was used, and the time dependency and reproducibility of mold dimensions were examined in the same manner as described in Referential Examples 1 to 5. Table 9 shows the results.

TABLE 9.—TIME DEPENDENCY OF POLYSTYRENE-CONTAINING IMPRESSION MATERIAL

| | Example— | | | | |
|---|---|---|---|---|---|
| | 31 | 32 | 33 | 34 | 35 |
| Standing time (hours) | 0 | 1.5 | 3.0 | 6.0 | 16.0 |
| Dimension: | | | | | |
| a (mm.) | 7.00 | 7.00 | 6.95 | 6.95 | 6.95 |
| b (mm.) | 2.30 | 2.30 | 2.30 | 2.30 | 2.30 |
| c (mm.) | 6.05 | 6.05 | 6.05 | 6.00 | 6.05 |

EXAMPLES 36 TO 40

As the master latex, a mixture of 80 percent JSR #0561 and 20 percent high-styrene latex (combined styrene 85%, TSC 66.8%) was used, and the time dependency and reproducibility of mold dimensions were examined in the same manner as in Referential Examples 1 to 5. The results are given in Table 10.

TABLE 10.—TIME DEPENDENCY OF HIGH-STYRENE LATEX-CONTAINING IMPRESSION MATERIAL

| | Example— | | | | |
|---|---|---|---|---|---|
| | 36 | 37 | 38 | 39 | 40 |
| Standing time (hours) | 0 | 1.5 | 3.0 | 6.0 | 16.0 |
| Dimension: | | | | | |
| a (mm.) | 7.00 | 7.00 | 7.00 | 7.00 | 7.05 |
| b (mm.) | 2.30 | 2.30 | 2.30 | 2.25 | 2.30 |
| c (mm.) | 6.05 | 6.05 | 6.05 | 6.05 | 6.05 |

EXAMPLES 41 TO 46

As the master latex, a mixture of JSR #0561 and ABS resin (JSR ABS #15 of Japan Synthetic Rubber Co.) (TSC 61%) was used for impression-taking in the same manner as in Referential Examples 1 to 5. The effects of different proportion of the ABS resin on the reproducibility of mold dimensions are given in Table 11. (The standing time was zero) Table 12 shows the effects of standing periods of time. (The mixing ratio used was 75 parts of JSR #0561 to 25 parts of the ABS resin emulsion.)

TABLE 11.—EFFECTS OF DIFFERENT PROPORTIONS OF ABS RESIN ON PERFORMANCE OF IMPRESSION MATERIAL

| | Referential example 1 | Example— | | |
|---|---|---|---|---|
| | | 41 | 42 | 43 |
| ABS resin emulsion (percent) | 0 | 10 | 25 | 40 |
| JSR #0561 (percent) | 100 | 90 | 75 | 60 |
| Dimension: | | | | |
| a (mm.) | 7.00 | 7.00 | 7.05 | 7.05 |
| b (mm.) | 2.15 | 2.30 | 2.30 | 2.30 |
| c (mm.) | 6.00 | 6.00 | 6.05 | 6.10 |

TABLE 12.—TIME DEPENDENCY OF ABS RESIN-CONTAINING IMPRESSION MATERIAL

| | Example— | | |
|---|---|---|---|
| | 44 | 45 | 46 |
| Standing time (hours) | 0 | 6 | 16 |
| Dimension: | | | |
| a (mm.) | 7.05 | 7.00 | 7.00 |
| b (mm.) | 2.30 | 2.30 | 2.30 |
| c (mm.) | 6.05 | 6.05 | 6.05 |

REFERENTIAL EXAMPLES 6 TO 10

(A) Preparation of master latex

| | Parts |
|---|---|
| NR latex | 100 |
| Sodium alginate | 0.5 |
| Sodium pyrophosphate | 0.5 |
| Calcium carbonate | 10 |
| Total | 111.0 |

These were thoroughly mixed up, and the mxiture was allowed to stand for more than one full day.

(B) Manufacture of impression material and impression-taking (This process was worked out as same as Referential Examples 1 to 5)

(C) Reproduction of impression material mold with gypsum (This process was worked out as same as Referential Examples 1 to 5)

As a criterion for determination of dimensional stability, the period of standing time at room temperature required between the removal of the impression mold following the impression-taking with the particular impression material (B) and the reproduction of the impression mold with gypsum was varied and the dimensions of the gypsum reproduction were measured. The results are given in Table 13.

TABLE 13

| | Referential example— | | | | | Actual mold dimensions |
|---|---|---|---|---|---|---|
| | 6 | 7 | 8 | 9 | 10 | |
| Standing time (hours) | 0 | 1.5 | 3.0 | 6.0 | 16.0 | |
| Demension: | | | | | | |
| a (mm.) | 7.15 | 7.20 | 7.20 | 7.40 | 7.40 | 7.00 |
| b (mm.) | 2.35 | 2.30 | 2.35 | 2.40 | 2.40 | 2.30 |
| c (mm.) | 6.20 | 6.30 | 6.50 | 6.60 | 6.70 | 6.00 |

EXAMPLES 47 to 74

As master latices, NR (natural rubber), IR, NBR and IIR latices were used respectively in mixture with emulsions of polycyclopentadiene, polystyrene, ABS resin and polymethyl methacrylate (PMMA) (TSC 61–69%). After impression-taking with these compositions in the manner as described in Referential Examples 6 to 10, the moldings were examined or their dimensional stability. The results are shown in Tables 14 and 15. Table 14 shows the dimensional changes of the products formed of the combinations of NR, IR, IIR and NBR latices and the various resin emulsions. Throughout these examples, the standing time was set at naught. Table 15 indicates the changes with time recorded when the mixtures of NR and IR latices and the various resin emulsions (at a mixing ratio of 75:25) were used.

TABLE 14.—CHANGES WITH DIFFERENT COMPOSITIONS

|  | Referential Example 1 | Example 47 | Example 48 | Example 49 |
|---|---|---|---|---|
| Polycyclopentadiene (percent) | 0 | 10 | 25 | 40 |
| NR latex (percent) | 100 | 90 | 75 | 60 |
| Dimension: |  |  |  |  |
| a (mm.) | 7.15 | 7.00 | 7.00 | 7.00 |
| b (mm.) | 2.35 | 2.30 | 2.30 | 2.25 |
| c (mm.) | 6.20 | 6.05 | 6.05 | 6.05 |

|  | Referential Example 1 | Example 50 | Example 51 | Example 52 |
|---|---|---|---|---|
| Polystyrene (percent) | 0 | 10 | 25 | 40 |
| NR latex (percent) | 100 | 90 | 75 | 60 |
| Dimension: |  |  |  |  |
| a (mm.) | 7.15 | 7.00 | 7.00 | 7.00 |
| b (mm.) | 2.35 | 2.25 | 2.30 | 2.30 |
| c (mm.) | 6.20 | 6.00 | 6.00 | 6.05 |

|  | Example 53 | Example 54 | Example 55 | Example 56 |
|---|---|---|---|---|
| ABS resin (percent) | 0 | 10 | 25 | 40 |
| IR latex (percent) | 100 | 90 | 75 | 60 |
| Dimension: |  |  |  |  |
| a (mm.) | 7.15 | 7.00 | 7.00 | 7.00 |
| b (mm.) | 2.25 | 2.30 | 2.25 | 2.30 |
| c (mm.) | 6.25 | 6.05 | 6.00 | 6.00 |

|  | Example 57 | Example 58 | Example 59 | Example 60 |
|---|---|---|---|---|
| PMMA (percent) | 0 | 10 | 25 | 40 |
| IIR latex (percent) | 100 | 90 | 75 | 60 |
| Dimension: |  |  |  |  |
| a (mm.) | 7.20 | 7.05 | 7.00 | 7.00 |
| b (mm.) | 2.30 | 2.30 | 2.30 | 2.30 |
| c (mm.) | 6.30 | 6.00 | 6.00 | 6.05 |

|  | Example 61 | Example 62 | Example 63 | Example 64 |
|---|---|---|---|---|
| Polystyrene (percent) | 0 | 10 | 25 | 40 |
| NBR latex (percent) | 100 | 90 | 75 | 60 |
| Dimension: |  |  |  |  |
| a (mm.) | 7.25 | 7.00 | 7.00 | 7.00 |
| b (mm.) | 2.35 | 2.25 | 2.30 | 2.30 |
| c (mm.) | 6.30 | 6.00 | 6.00 | 6.00 |

TABLE 15.—CHANGES WITH TIME

NR-polycyclopentadiene Mixed Impression Material

|  | Example No. 58 | Example No. 65 | Example No. 66 |
|---|---|---|---|
| Standing time (hours) | 0 | 6 | 16 |
| Dimension: |  |  |  |
| a (mm.) | 7.00 | 7.00 | 7.00 |
| b (mm.) | 2.30 | 2.30 | 2.25 |
| c (mm.) | 6.05 | 6.00 | 6.00 |

NR-polystyrene Mixed Impression Material

|  | Example No. 51 | Example No. 67 | Example No. 68 |
|---|---|---|---|
| Standing time (hours) | 0 | 6 | 16 |
| Dimension: |  |  |  |
| a (mm.) | 7.00 | 7.00 | 7.00 |
| b (mm.) | 2.30 | 2.30 | 2.30 |
| c (mm.) | 6.00 | 6.00 | 6.00 |

IR-ABS Resin Mixed Impression Material

|  | Example No. | Example No. | Example No. |
|---|---|---|---|
| Standing time (hours) | 0 | 6 | 16 |
| Dimension: |  |  |  |
| a (mm.) | 7.00 | 7.00 | 7.00 |
| b (mm.) | 2.25 | 2.25 | 2.25 |
| c (mm.) | 6.00 | 6.00 | 6.00 |

IIR-PMMA (polymethyl methacrylate) Mixed Impression Material

|  | Example No. 59 | Example No. 71 | Example No. 72 |
|---|---|---|---|
| Standing time (hours) | 0 | 6 | 16 |
| Dimension: |  |  |  |
| a (mm.) | 7.00 | 7.00 | 7.00 |
| b (mm.) | 2.30 | 2.30 | 2.30 |
| c (mm.) | 6.00 | 6.00 | 6.05 |

NBR-polystyrene Mixed Impression Material

|  | Example No. 63 | Example No. 73 | Example No. 74 |
|---|---|---|---|
| Standing time (hours) | 0 | 6 | 16 |
| Dimension: |  |  |  |
| a (mm.) | 7.00 | 7.00 | 7.00 |
| b (mm.) | 2.30 | 2.25 | 2.30 |
| c (mm.) | 6.00 | 6.00 | 6.05 |

EXAMPLE 75

This is an example in which emulsions of different mold releasing agents were added to equal portions of a high-polymer emulsion.

(A) Preparation of master latex (TSC 71.4%)

|  | Parts |
|---|---|
| JSR #0561 (SBR latex) | 80 |
| JSR #0601 (high-styrene latex) | 20 |
| Sodium pyrophosphate | 2.0 |
| Sodium alginate | 2.0 |
| Calcium carbonate | 10 |
| Total | 114.0 |

This composition was divided into portion and, with the addition of given amounts of emulsions of mold releasing agents (Tables 16 and 17), the mixtures were mixed well and allowed to stand for more than one full day. The emulsions of mold releasing agents were prepared in the following way.

Two parts of each mold releasing agent and one part of a 10% aqueous solution of sodium lauryl sulfonate were placed in a home mixer and agitated together at 10,000 r.p.m. for one minute to prepare an emulsion.

(B) Manufacture of impression material and impression-taking (This process was worked out as same as Referential Examples 1 to 5)

(C) Reproduction of impression material mold with gypsum (This process was worked out as same as Referential Examples 1 to 5)

As a criterion for determination of dimensional stability, the period of standing time at room temperature required between the removal of the impression mold following the impression-taking with the particular impression material (B) and the reproduction of the impression mold with gypsum was varied and the dimensions of the gypsum reproduction were measured. The results are given in Tables 16 and 17.

TABLE 16.—CHANGES WITH TIME (WITH A MOLD RELEASING AGENT OF LIQUID PARAFFIN)

With 0.5% Liquid Paraffin on the Basis of the Latex

|  | Example No. 1 | Example No. 2 | Example No. 3 |
|---|---|---|---|
| Standing time (hours) | 0 | 6 | 16 |
| Dimensions: |  |  |  |
| a (mm.) | 7.00 | 7.00 | 7.00 |
| b (mm.) | 2.30 | 2.30 | 2.30 |
| c (mm.) | 6.00 | 6.05 | 6.00 |

With 1% Liquid Paraffin on the Bassi of the Latex

|  | Example No. 4 | Example No. 5 | Example No. 6 |
|---|---|---|---|
| Standing time (hours) | 0 | 6 | 16 |
| Dimensions: |  |  |  |
| a (mm.) | 7.00 | 7.00 | 7.05 |
| b (mm.) | 2.30 | 2.30 | 2.30 |
| c (mm.) | 6.00 | 6.00 | 6.05 |

With 2% Liquid Paraffin on the Basis of the Latex

|  | Example No. 7 | Example No. 8 | Example No. 9 |
|---|---|---|---|
| Standing time (hours) | 0 | 6 | 16 |
| Dimensions: |  |  |  |
| a (mm.) | 7.05 | 7.00 | 7.00 |
| b (mm.) | 2.25 | 2.30 | 2.30 |
| c (mm.) | 6.00 | 6.05 | 6.05 |

With 3% Liquid Paraffin on the Basis of the Latex

| | Example No.— | | |
|---|---|---|---|
| | 10 | 11 | 12 |
| Standing time (hours) | 0 | 6 | 16 |
| Dimensions: | | | |
| a (mm.) | 7.00 | 7.00 | 7.05 |
| b (mm.) | 2.30 | 2.30 | 2.30 |
| c (mm.) | 6.00 | 6.00 | 6.00 |

With 4% Liquid Paraffin on the Basis of the Latex

| | Example No.— | | |
|---|---|---|---|
| | 13 | 14 | 15 |
| Standing time (hours) | 0 | 6 | 16 |
| Dimensions: | | | |
| a (mm.) | 7.00 | 7.00 | 7.00 |
| b (mm.) | 2.25 | 2.25 | 2.30 |
| c (mm.) | 6.00 | 6.00 | 6.05 |

With 5% Liquid Paraffin on the Basis of the Latex

| | Example No.— | | |
|---|---|---|---|
| | 16 | 17 | 18 |
| Standing time (hours) | 0 | 6 | 16 |
| Dimensions: | | | |
| a (mm.) | 7.00 | 7.00 | 7.00 |
| b (mm.) | 2.30 | 2.30 | 2.30 |
| c (mm.) | 6.00 | 6.00 | 6.00 |

With 8% Liquid Paraffin on the Basis of the Latex

| | Example No.— | | |
|---|---|---|---|
| | 19 | 20 | 21 |
| Standing time (hours) | 0 | 6 | 16 |
| Dimensions: | | | |
| a (mm.) | 7.05 | 7.05 | 7.05 |
| b (mm.) | 2.35 | 2.35 | 2.30 |
| c (mm.) | 6.00 | 6.05 | 6.05 |

With 10% Liquid Paraffin on the Basis of the Latex

| | Example No.— | | |
|---|---|---|---|
| | 22 | 23 | 24 |
| Standing time (hours) | 0 | 6 | 16 |
| Dimensions: | | | |
| a (mm.) | 7.05 | 7.05 | 7.05 |
| b (mm.) | 2.35 | 2.30 | 2.35 |
| c (mm.) | 6.10 | 6.10 | 6.10 |

TABLE 17.—CHANGES WITH TIME (WITH A MOLD RELEASING AGENT OF UNDECENE)

With 0.5% Undecene on the Basis of the Latex

| | Example No.— | | |
|---|---|---|---|
| | 25 | 26 | 27 |
| Standing time (hours) | 0 | 6 | 16 |
| Dimensions: | | | |
| a (mm.) | 7.00 | 7.00 | 7.00 |
| b (mm.) | 2.30 | 2.30 | 2.30 |
| c (mm.) | 6.00 | 6.00 | 6.05 |

With 1% Undecene on the Basis of the Latex

| | Example No.— | | |
|---|---|---|---|
| | 28 | 29 | 30 |
| Standing time (hours) | 0 | 6 | 16 |
| Dimensions: | | | |
| a (mm.) | 7.00 | 7.05 | 7.05 |
| b (mm.) | 2.30 | 2.30 | 2.30 |
| c (mm.) | 6.00 | 6.00 | 6.05 |

With 2% Undecene on the Basis of the Latex

| | Example No.— | | |
|---|---|---|---|
| | 31 | 32 | 33 |
| Standing time (hours) | 0 | 6 | 16 |
| Dimensions: | | | |
| a (mm.) | 7.00 | 7.05 | 7.00 |
| b (mm.) | 2.30 | 2.30 | 2.30 |
| c (mm.) | 6.00 | 6.00 | 6.05 |

With 5% Undecene on the Basis of the Latex

| | Example No.— | | |
|---|---|---|---|
| | 34 | 35 | 36 |
| Standing time (hours) | 0 | 6 | 10 |
| Dimensions: | | | |
| a (mm.) | 7.00 | 7.05 | 7.31 |
| b (mm.) | 2.25 | 2.30 | 2.00 |
| c (mm.) | 6.05 | 6.05 | 6.16 |

With 8% Undecene on the Basis of the Latex

| | Example No.— | | |
|---|---|---|---|
| | 37 | 38 | 39 |
| Standing time (hours) | 0 | 6 | 16 |
| Dimensions: | | | |
| a (mm.) | 7.05 | 7.05 | 7.10 |
| b (mm.) | 2.30 | 2.35 | 2.35 |
| c (mm.) | 6.05 | 6.10 | 6.10 |

EXAMPLE 76

Figure 5:
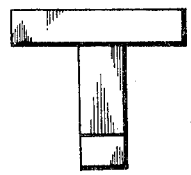
FIG. 5 is a front view of another form of impression mold.
Figure 6:
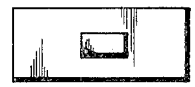
FIG. 6 is a bottom view of the mold of FIG. 5.
Figure 7:
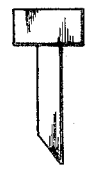
FIG. 7 is a side view of the mold of FIG. 5.
Figure 8:
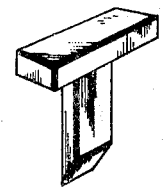
FIG. 8 is a perspective view of a reproduced mold obtained from another form of impression mold.

Generally in accordance with Example 75, tests were conducted with a master latex with or without the addition of a mold releasing agent. As the impression mold, the one illustrated in FIGS. 5 to 7 was employed. The mold releasing conditions observed are compared in Table 18. The material of the reproduced mold (FIG. 8) was polymethyl methacrylate. In this example, the impression mold shown in FIGS. 5 to 7 was used, because the impression mold of FIG. 3 is not pointed at the lower end and hardly shows the difference between the composition which contains a mold releasing agent and the composition which does not.

(A) Master latex (TSC 65%) without mold releasing agent

| | Parts |
|---|---|
| JSR #0561 | 80 |
| JSR #0601 | 20 |
| Sodium pyrophosphate | 2.0 |
| Sodium alginate | 2.0 |
| Calcium carbonate | 10.0 |
| Phenol phthalein | 0.1 |
| Total | 114.1 |

(B) Master latex (TSC 65%) with mold releasing agent

| | Parts |
|---|---|
| JSR #0561 | 80 |
| JSR #0601 | 20 |
| Sodium pyrophosphate | 2.0 |
| Sodium alginate | 2.0 |
| Calcium carbonate | 10.0 |
| Phenol phthalein | 0.1 |
| Mold releasing agent (as liquid paraffin) | 2.0 |
| Total | 116.1 |

TABLE 18

| Testing stage | Impression material | Condition | | |
|---|---|---|---|---|
| | | Best | Good | Poor |
| (1) Kneading on rubber ball mill | Master latex (A) | | Smooth | |
| | Master latex (B) | | do | |
| (2) Transfer from rubber ball mill to container. | Master latex (A) | | Ordinary | |
| | Master latex (B) | East to carry | | |
| (3) Insertion of impression mold | Master latex (A) | | do | |
| | Master latex (B) | | do | |
| (4) Withdrawal of impression mold | Master latex (A) | | | No good.* |
| | Master latex (B) | East to carry | | |
| (5) Appearance of reproduced mold | Master latex (A) | | Fairly precise | Lacks fineness. |
| | Master latex (B) | Precise and fine | | |

*The impression mold is difficult to remove. The surface of the impressed mold is not completely and cleanly exposed.

What is claimed is:

1. An impression material comprising a coagulated mixture of an inorganic electrolyte, at least one latex emulsion selected from the group consisting of natural rubber and synthetic rubber latices and at least one emulsion selected from the group consisting of emulsions of polycyclopentadiene and a polymer in which cyclopentadiene in 1,4- or 1,2-form is polymerized to a series of five-member rings of carbon atoms, with an approximate molecular weight of $$[\eta]_{toluene}^{30°} = 0.1 \text{ to } 5.0$$

and a homopolymer or copolymer of vinyl monomers having the general formula

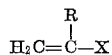

wherein X represents a hydrogen atom, alkyl group having $C_1$–$C_{20}$, an aryl group, halogen, nitrile group, carboxyl group, carboalkoxy group, or acyloxy group, and R represents a hydrogen atom, alkyl group having $C_1$–$C_{10}$ or alkenyl group having $C_2$–$C_{10}$, the amount of said polycyclopentadiene being from 10 to 50 percent based on the weight of latex and the amount of vinyl polymer is 10 to 50 percent based on the latex.

2. The impression material of claim 1 which further comprises at least one compound in emulsified form selected from the group consisting of liquid paraffin, solid paraffin, squalane, and monoolefinic and diolefinic hydrocarbons.

3. An impression material according to claim 1 wherein the homopolymer or copolymer of vinyl monomers is a polyolefin, polystyrene, poly-α-methyl styrene, polyvinyl chloride, polyacrylonitrile, polyacrylic acid, polymethyl methacrylate, polyvinyl acetate, styrene-butadiene copolymer with a styrene content of over 50 percent by weight, acrylonitrile-styrene copolymer, or acrylonitrile-butadiene-styrene resin.

4. An impression material according to claim 1 wherein the inorganic electrolyte is at least one compound selected from the group consisting of gypsum, magnesium sulfate, aluminum sulfate, iron sulfate, sodium silicofluoride, and alum.

5. An impression material according to claim 2 wherein the liquid paraffin, solid paraffin, squalane, and monoolefinic and diolefinic hydrocarbons have from 10 to 200 carbon atoms in the molecule and having boiling points of not lower than 100° C.

6. An impression material as claimed in claim 1, wherein said aryl group is a nucleus selected from the phenyl series.

7. An impression material as claimed in claim 6, wherein said nucleus is phenyl.

8. A process for preparing the impression materials of claim 1 which comprises the steps of mixing at least one latex emulsion selected from the group consisting of natural rubber and synthetic rubber latices and at least one emulsion selected from the group consisting of emulsions of polycyclopentadiene and vinyl polymers, and then coagulating said mixture with an inorganic electrolyte.

9. A process for preparing impression materials of claim 2 which comprises the steps of mixing at least one latex emulsion selected from the group consisting of natural rubber and synthetic rubber latices, at least one emulsion selected from the group consisting of emulsions of polycyclopentadiene and vinyl polymers, and at least one compound selected from the group consisting of liquid paraffin, solid paraffin, squalane, and monoolefinic and diolefinic hydrocarbons, and then coagulating said mixture with an inorganic electrolyte.

10. An impression material according to claim 1 wherein the synthetic rubber latex is at least one latex selected from the latices of styrene-butadiene rubber, polybutadiene, polyisoprene, acrylonitrile-butadiene rubber, isobutylene-isoprene rubber, ethylene-propylene rubber, and acrylic rubber.

References Cited

UNITED STATES PATENTS

| | | | |
|---|---|---|---|
| 3,103,498 | 9/1963 | Scriba | 260—894 |
| 3,145,189 | 8/1964 | Fourier | 260—894 |
| 3,513,227 | 5/1970 | Coene et al. | 260—892 |
| 3,620,778 | 11/1971 | Morrell | 106—35 |

FOREIGN PATENTS

| | | | |
|---|---|---|---|
| 1,219,339 | 1/1971 | Great Britain | 106—35 |

MELVIN GOLDSTEIN, Primary Examiner

E. WOODBERRY, Assistant Examiner

U.S. Cl. X.R.

260—17, 17.4 ST, BB, 5, 29.7 GP, 29.7 R, 33.6 UA, 889, 890, 892, 893, 894